Oct. 26, 1965  V. J. KRITSKE  3,213,809
ADJUSTABLE TABLE AND BRAKE MECHANISM THEREFOR
Filed Jan. 13, 1964  3 Sheets-Sheet 1
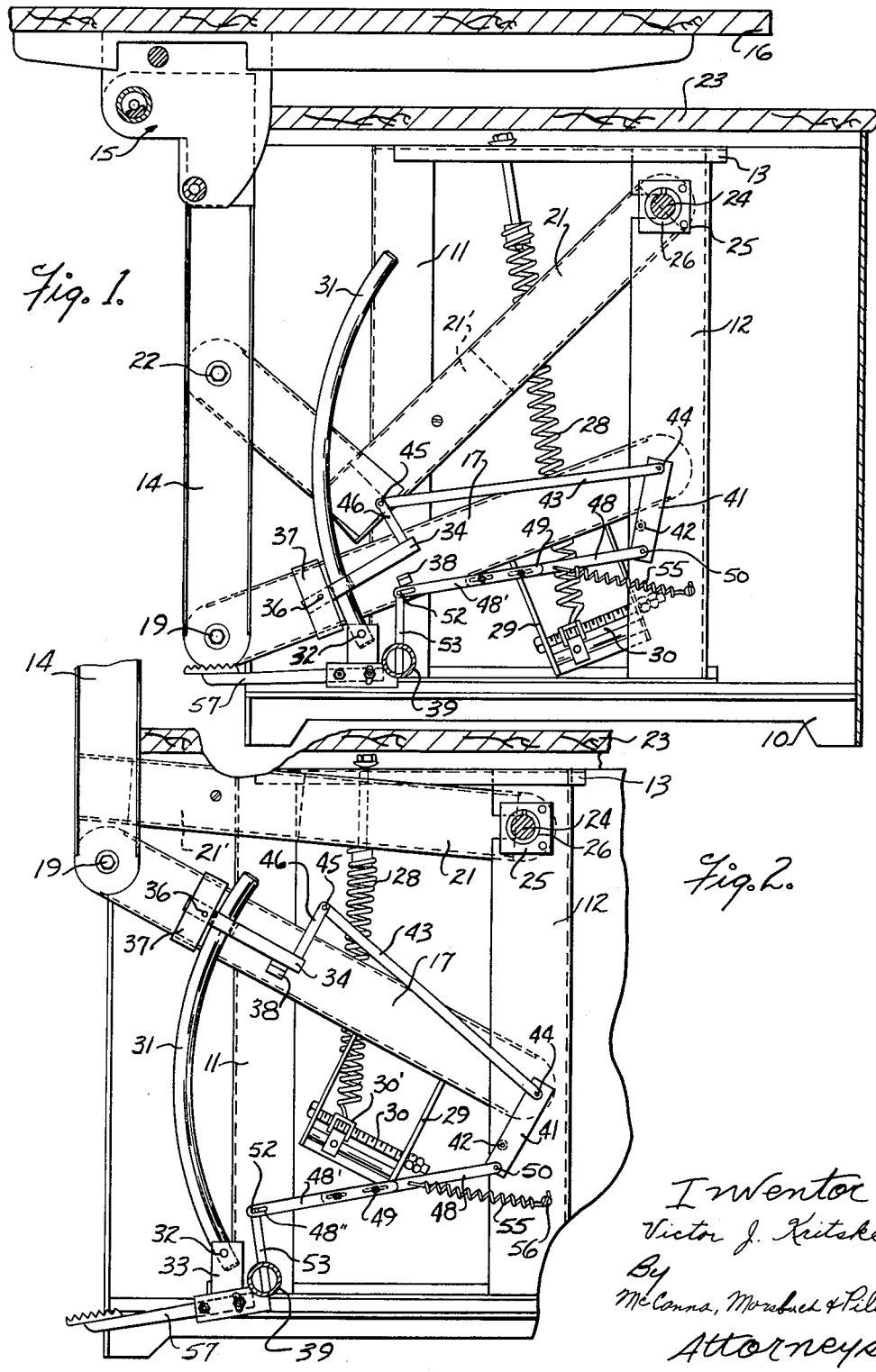

Oct. 26, 1965     V. J. KRITSKE     3,213,809
ADJUSTABLE TABLE AND BRAKE MECHANISM THEREFOR
Filed Jan. 13, 1964     3 Sheets-Sheet 2
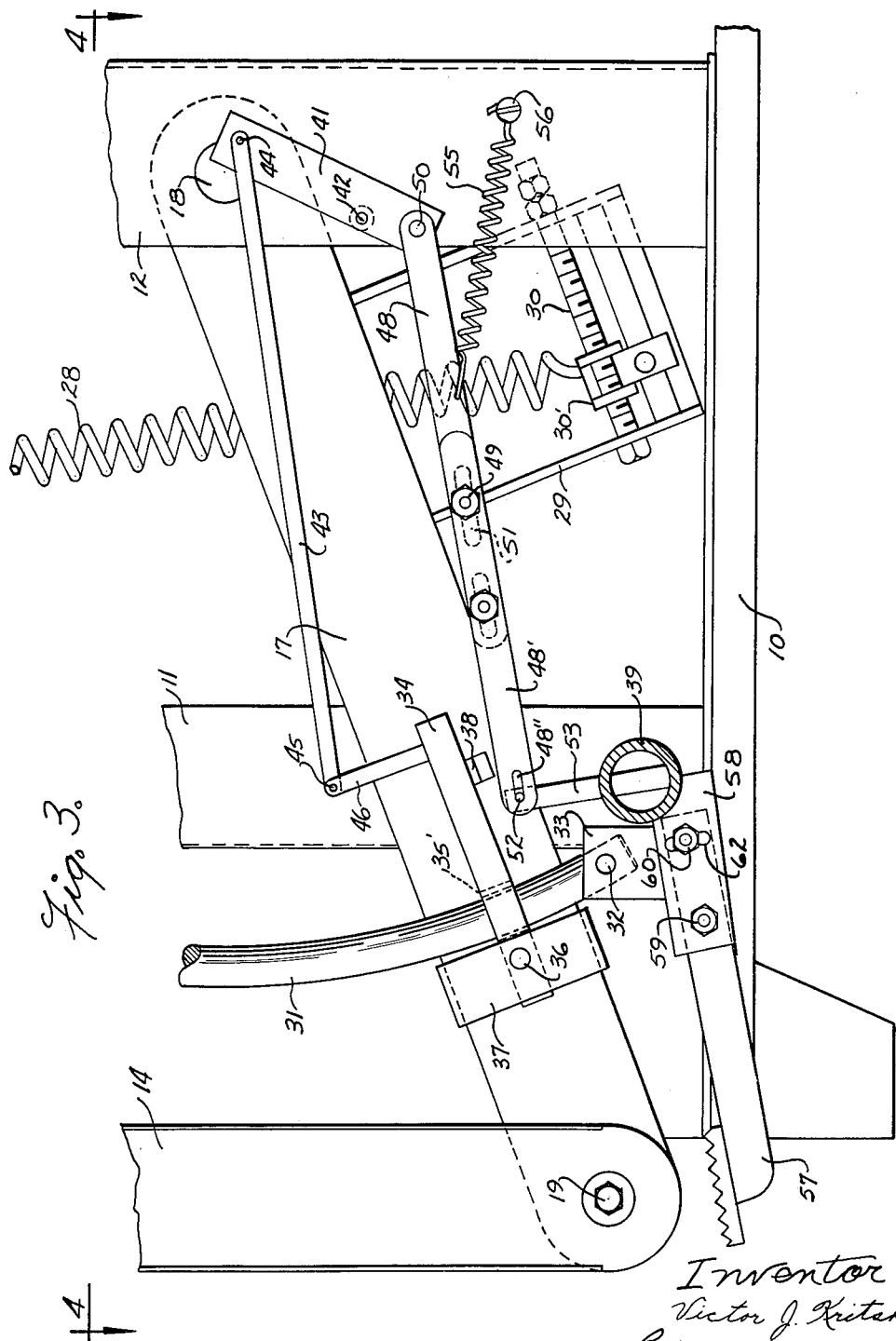

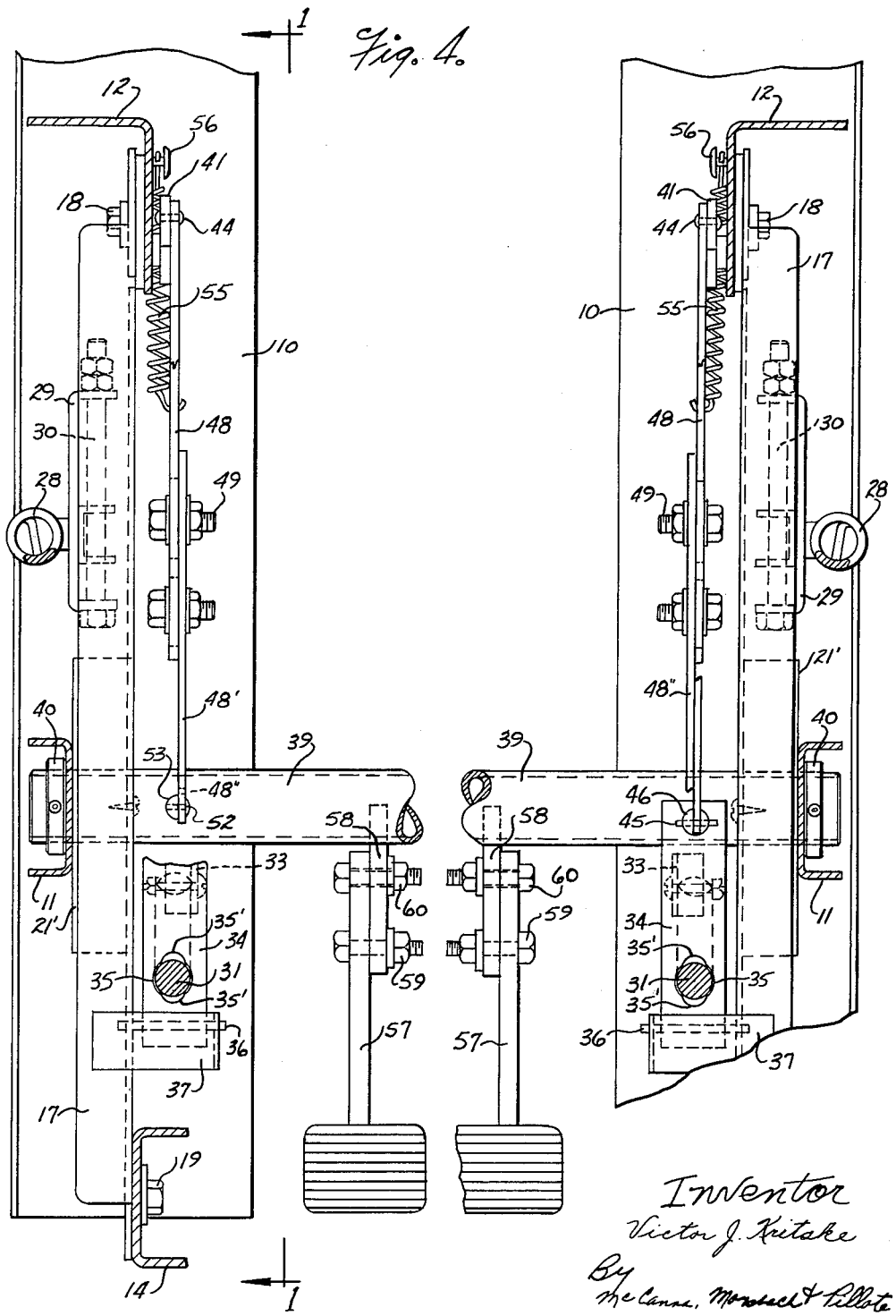

United States Patent Office 3,213,809
Patented Oct. 26, 1965

3,213,809
ADJUSTABLE TABLE AND BRAKE
MECHANISM THEREFOR
Victor J. Kritske, Sheboygan, Wis., assignor to Mayline
Company, Inc., Sheboygan, Wis., a corporation of
Wisconsin
Filed Jan. 13, 1964, Ser. No. 337,499
10 Claims. (Cl. 108—146)

This application is a continuation-in-part of my co-pending application for "Adjustable Table and Brake Mechanism Therefor," Serial No. 276,378, filed April 29, 1963, now abandoned.

This invention relates to improvements in tables having a vertically adjustable top board and particularly to mechanisms for adjustably securing the top board at any selected elevated position. While the invention may be applied to other tables, it is particularly adaptable for use on drafting tables which at times need to be vertically adjustable to different work levels.

The invention relates more particularly to improvements in the locking or braking mechanism by means of which a table top may be secured at any selected elevated position.

An important object of the invention is to provide an improved lock or brake which is adapted to lock the vertically adjustable table in any selected position when the operating linkage therefor has been released, and which lock will become even more securely locked upon the application of downward pressure on the table top occurring in normal use.

A further object of this invention is to provide a vertically adjustable table in which the brake mechanism is mounted on a vertically movable portion of the table and a brake operating mechanism is mounted on a stationary portion of the table and operatively connected to the brake mechanism to operate the latter in all different positions of the table.

Yet another object of this invention is to provide a vertically adjustable table in accordance with the foregoing object in which like brake mechanisms are provided at each end of the table and a common brake operating mechanism is mounted on a stationary portion of the table and operatively connected to both brake mechanisms in such a manner as to assure movement of both brake mechanisms into their locking position when the common operating mechanism is released.

Another object of the invention is to provide an improved locking or braking mechanism for vertically adjustable table tops so designed that it will accommodate itself to minor variations in the dimensions or positioning of various portions of the braking mechanism.

Another object of the invention is to provide a locking mechanism of the character described which is simple, rugged and of economical construction and entirely reliable in operation.

These objects together with other objects and advantages of the invention, will be more readily appreciated as they become better understood by reference to the following detailed description when taken in connection with the accompanying drawings wherein:

FIGURE 1 is a vertical sectional view through the table taken on the plane 1—1 of FIG. 4 looking toward the locking brake mechanism at the left end of the table, showing the table top locked in a lower position;

FIG. 2 is a vertical sectional view through the table from the same view point, showing the table top at a raised position but with the brake released;

FIG. 3 is a view similar to that of FIG. 1, but on a larger scale and showing the table top lowered but not locked;

FIG. 4 is a horizontal sectional view taken on the plane 4—4 of FIG. 3 and illustrating the board supports and brake mechanism at each end of the table.

It should be understood that the table support and brake mechanism specifically illustrated in FIGS. 1–3 for mounting at the left of the table is preferably duplicated at the right end of the table as shown in FIG. 4, functioning in the same manner, but reversed as may be necessary for such opposite positioning. One or more foot operated pedals can be provided to operate the duplicate brakes. In order to simplify description, like numerals are used to designate corresponding parts at opposite ends of the table.

The table, which may be referred to hereinafter as a drafting table, includes a stationary support frame and a top board 16 mounted on the support frame for vertical adjustment relative thereto. The support frame conveniently comprises like end frame structure at each end of the table, and in the embodiment shown in FIGS. 1 and 2, the end frame structures each include a base 10 and vertical frame members 11 and 12, the tops of which may be connected by a horizontal frame member 13. A vertically movable rigid table supporting member 14 carries on its upper end and supports a lockable board tilting mechanism generally indicated at 15 (FIG. 1) not forming any part of this invention but on top of which is secured the table top 16. The table supporting members are preferably mounted for vertical movement by a parallelogram type linkage at each end of the table, when linkages maintain the table supporting member upright in all operative positions. In the embodiment shown, the linkages include a lower arm 17 which is pivotally supported on a stub shaft 18 (see FIGS. 3 and 4) on the vertical frame member 12, and is also pivotally connected at 19 to the lower end of the vertical member 14. The parallelogram linkages also include an upper arm 21 which is pivotally connected to the member 14 at 22. The other end of the upper arms 21 at opposite ends of the table and rigidly attached to a rod 24 that extends lengthwise of the table and is rotatably supported in bearings 26 provided in the upper portion of the vertical frame members 12. This rod is welded to the arms 21 at both ends of the table to equalize movement of the upper arms and thereby avoid lengthwise tilting of the top board. As will be seen from FIGS. 1 and 2, the arms 17 and 21 form a parallelogram type linkage which operates to maintain the support member 14 upright in all positions. The upper arms 21 are preferably made L-shaped as shown in FIG. 1 to provide clearance for the stationary desk top 23 attached to the end frame structures, when the top board 16 is elevated as shown in FIG. 2. Collars 26 are secured to the rod, as by set screws and engage the bearings 25 to prevent axial shifting of the rod 24. The board and board supports may be counterbalanced in any suitable manner and, as shown, a counterbalancing spring 28 has its upper end anchored in a conventional manner to the horizontal frame member 13 and its lower end secured to a bracket 29 which rigidly depends from the lower parallelogram arm 17. The threaded screw 30 and screw follower 30' afford means for shifting the effective point of connection of the spring 28 to the arm, toward and away from the pivot point of the arm 17. Shifting the point of attachment away from the pivot point increases the leverage and lifting power of the spring. The spring is preferably adjusted to substantially counterbalance the weight of the board and arms together with the weight of any drafting machine, lights, etc. which may be mounted on the board to enable easy adjustment of the height of the board without, however, overbalancing the board in an upward direction. In order to inhibit longitudinal shifting of the table top relative to the frame structure, one or both of the arms 21, 17 at each end of the table are provided with wear plates 21' which slidably engage the inner face of the posts 11 in all operative positions of the arms.

A curved sector rod 31 is pivotally supported at 32 upon a rigid bracket 33 extending upwardly from the base frame member 10 of each end frame structure. For operative engagement with the sector rod 31, there is provided a brake block consisting of a heavy bar 34 provided with a specially shaped aperture 35 shown in FIG. 4. It will be noted that the central portion of this aperture is enough larger than the diameter of the cylindrical rod 31 to permit free relative movement of the brake block and the rod, but that at opposite ends of this enlarged aperture, there are reduced recesses such as the recess 35' which merge with the larger aperture 35 at rather sharp shoulders. It will be perceived that if this brake block be rocked out of the position shown in FIG. 4, these sharp shoulders will grip and bind on the sector rod 31 and thereafter prevent relative movement of the brake block and the sector rod. The block 34 is pivoted on a pin upon the arm 17, the outer end of the pin being firmly supported by means of a U-shaped bracket 37 whose ends are welded to arm 17. Thus, the pivotal support for the brake block is located adjacent to but laterally offset from the sector rod 31 at all times to furnish maximum and adequate support for the gripping and braking action. A stop projection in the form of an angular bracket 38 is provided, as shown on the side of the arm 17, to limit the unlocking rotation of the brake block when the latter extends substantially perpendicular to the respective sector rod 31 so that, when the block strikes the stop member 38, the sector rod is released. A brake operating mechanism is mounted on the support frame for the table and operatively connected to the locking members on the movable support arms to enable releasing of the locking members in all different positions of the support arms 17. The brake operating mechanism includes a treadle shaft 39 that extends lengthwise of the table and an operating linkage at each end of the table operatively connecting the treadle shaft to a respective one of the locking members to enable simultaneous release of both locking members. The shaft 39 is conveniently rotatably supported or journaled in the upright frame members 11 at each end of the table and is retained against the endwise movement by collars 40 (see FIG. 4) which are secured to the shaft by set screws. The operating linkages each include a lever 41 which is pivotally mounted intermediate its ends at 42 on the post 12 of the respective end frame structure. A link 43 is pivotally connected at 44 to the lever 41 at one side of the pivot 42, and the other end of the link 43 is pivotally connected at 45 to a post 46 that extends laterally of the respective locking member 34 to move the latter about its pivot 36 in response to movement of the lever 41. The levers 41 are operatively connected to the treadle shaft 39 by preferably adjustable links 48. The adjustable links include a longitudinally adjustable section 48' which is adjustably secured to the link 48 by fasteners 49 that extend through slots 51 in the link 48. The links 48 are pivotally attached to the lever 41 at 50. The link sections 48' are pivotally connected at 52 to posts 53 which extend laterally of the shaft 39 adjacent opposite ends, to effect movement of the levers 41 and hence the locking members 34 in response to movement of the shaft. The posts 53 are non-rotatably secured to the shaft in any suitable manner and the link sections 48–48' of the linkages at each end of the table are adjusted so as to substantially equalize movement of the locking members in response to turning of the common treadle shaft 39. However, in practice, it has been found that even very small errors in the adjustment of the linkages or even a small twisting in the shaft 39 can impede full movement of one or the other of the locking members to its rod gripping position. It is accordingly preferable to provide a limited lost-motion connection in at least one of the linkages so that, when one of the locking members reaches its locking position with the respective rod, the common operating mechanism including shaft 39 does not prevent movement of the other locking member to its rod gripping position. This lost motion is conveniently provided by a slot 48" in the link section 48', and which slot receives the pivot pin 52 and permits limited lost-motion between that link and the respective post 53. The locking members are independently and yieldably urged to their rod gripping positions by springs 55 connected to the respective linkage at a point intermediate the lost-motion connection and the respective locking member. As shown, the springs 55 are attached to one end to the link sections 48 and the other end of the springs are anchored by pins 56 to frame member 12.

One or more foot operated pedals 57 are secured to the hollow shaft 39 to provide for rotation through the described linkage of the braking block from locking position to fully unlocked position. The pedals are conveniently attached to the shaft for limited angular adjustment and, as shown, the shaft has an ear 58 rigidly secured thereto as by welding, and the pedal 57 is attached by fasteners 59 and 60 to the ear. The ear has a slot 62 concentric with the fasteners 59 to enable angular adjustment of the pedal, and the pedal can then be locked in its adjusted position by tightening the fastener 60. The coil springs 55 which are connected as shown to the links 48 and to the table frame at 56, resiliently urge the pedal upwardly and individually operate through the linkages 48, 41 and 43 to firmly rotate the respective braking blocks 34 into a gripping relation with the respective sector rod 31. This gripping action will effectively lock the parallelogram support for the table top at any selected position when the pedal 57 is released. Since the locking blocks are urged upwardly by the spring to their rod gripping position and since the pivot axis 36 of the locking block is laterally offset from the sector rod 31, subsequent downward pressure on the table will tend to urge the pivot axes 36 downwardly relative to the respective rod to further tighten the grip of that block on the sector rod 31.

From the foregoing, it will be perceived that the locking members are yieldably urged into locking engagement with the pivoted sector rod 31, sometimes referred to as a brake rod by the springs 55 and that the locking members can be selectively moved to their release position by depressing the pedal 57. Since the pivot axes 44 of the links 43 to the lever 41 are disposed in approximate alignment with the pivot axes 18 of the lower arm 17, it will be seen that the locking members can be manually released in any position of the arms and will, moreover, remain in their released position so long as the pedal is depressed, even when the arms 17 are swung about their pivots 18. Further, the break rods are pivotally supported on the end frame structures to accommodate minor manufacturing variations in the shape or concentricity of the brake rod relative to the pivot axis of the arm 17. Also, the gripping of the block results from the combined action of spring 55 and the downward pressure exerted by the table top itself. As the pivotal support for the aperture block is somewhat removed from the block itself, downward pressure exerted through the vertical support 14 tends to tighten the grip.

While a preferred embodiment of the invention is shown and described herein, it should be understood that the invention is not limited to the details of the construction shown, but also includes such variations and modifications as come within the scope of the claims appended hereto.

I claim:

1. In combination with a table including a support frame and a top board, a vertically adjustable and lockable support for the board comprising, support means mounted on the frame for vertical movement relative thereto and connected with said board for supporting the latter, a brake rod supported on said frame and extending a vertical plane adjacent said vertically movable support means, a friction grip locking member pivotally supported on said support means for movement therewith and rockable relative to the support means between locking and non-locking positions, said locking member having an opening therein loosely embracing said rod when the member is in non-locking position, a margin of said opening being adapted to grip said rod in said locking position of the locking member, said opening in said locking member being eccentric to the pivotal support of the locking member on said support means and being normally urged when in gripping relation with said rod to have its grip tightened by downward pressure on said support means, and manually controlled means mounted on said frame and operatively connected to said locking member for moving the locking member into and out of locking position in each of the different moved positions of said support means.

2. In combination with a table including a support frame and a top board, a vertically adjustable and lockable support for the board comprising, first and second vertically movable support members connected to said board adjacent opposite ends thereof for supporting the board, means including first and second support arms mounted on said frame adjacent opposite ends of the frame for swinging movement about a common horizontal axis, said first and second support members being pivotally attached to said first and second support arms for movement therewith, first and second brake rods mounted on said frame respectively adjacent said first and second arms, first and second locking members respectively mounted on said first and second arms at a point spaced from said common axis, said first and second locking members respectively engaging said first and second rods and being movable relative to the respective arm to and from a locking position non-slidably engaging the respective rod, and a common operating means mounted on said frame and operatively connected to said first and second locking members for moving both of said locking members out of locking position to permit vertical movement of said table support members, said common operating means including a treadle shaft extending lengthwise of said frame and rotatably supported thereon, first and second linkages respectively connecting said treadle shaft to said first and second locking members for operating the latter, said linkages each including a lever pivotally mounted on said frame, a first link pivotally connected at one end to said lever and operatively connected at the other end to a respective locking member to move the latter into and out of locking position in response to movement of said lever, and a second link pivotally connected at one end to said lever and operatively connected at the other end to said treadle shaft to move the lever in response to movement of the treadle shaft, first and second spring means operatively connected to said first and second linkages to yieldably urged the first and second locking members into their locking positions, at least one of said linkages having a limited lost motion connection to said tradle shaft.

3. The combination of claim 2 wherein at least one of said links is longitudinally adjustable.

4. In combination with a table including a support frame and a top board, a vertically adjustable and lockable support for the board comprising, first and second vertically movable support members connected to said board adjacent opposite ends thereof for supporting the board, means including first and second support arms mounted on said frame adjacent opposite ends of the frame for swinging movement about a common horizontal axis, said first and second support members being pivotally attached to said first and second support arms for movement therewith, first and second brake rods mounted on said frame respectively adjacent said first and second arms, first and second locking members respectively mounted on said first and second arms at a point spaced from said common axis, said first and second locking members respectively engaging said first and second rods and being movable relative to the respective arm to and from a locking position non-slidably engaging the respective rod, and a common operating means mounted on said frame and operatively connected to said first and second locking members for moving both of said locking members out of locking position to permit vertical movement of said table support members, said common operating means including a treadle shaft extending lengthwise of said frame and rotatably supported thereon, first and second fingers attached to said shaft and extending laterally thereof adjacent opposite ends, first and second linkages respectively connecting said treadle shaft to said first and second locking members for operating the latter, said linkages each including a lever pivotally mounted on said frame; a first link pivotally connected at one end to said lever and operatively connected at the other end to a respective locking member to move the latter into and out of locking position in response to movement of said lever; and a second link pivotally connected at one end to said lever and having a pivotal connection at the other end to a respective one of the fingers on the treadle shaft to move the levers in response to movement of the movement of the treadle shaft, first and second spring means operatively connected to said first and second linkages to yieldably urge the first and second locking members into their locking position, said second links of each said first and second linkages having a limited lost motion connection to said first and second fingers on the treadle shaft.

5. In combination with a table including a support frame and a top board, a vertically adjustable and lockable support for the board comprising, a vertically movable support member connected with said board for supporting it, a pair of vertically spaced apart arms each pivotally supported at one end on said frame and each pivotally connected at its other end to said support member, an arcuate brake rod supported on said frame with its arc substantially concentric with and substantially removed from the pivotal support of one of said arms and extending in a vertical plane adjacent said one arm, a friction grip locking member pivotally supported on said one arm at a point radially removed from the pivotal support of that arm at a distance different than the radius of said arc, said locking member having an opening eccentric to its pivotal support and loosely embracing said rod, a margin of said opening being shaped to lockingly grip said rod when said member is in a locking position, said locking member being swingable upwardly relative to said one arm into rod locking position and downwardly relative to said one arm into a rod release position, the pivoted locking member being urged into a tighter rod gripping position when downward pressure is applied to said support member, and manually controlled means mounted on said frame and operatively connected with said locking member adapted for rocking said locking member out of locking position.

6. In a combination with a table including a support frame and a top board, a vertically adjustable and lockable support for the board comprising, a vertically movable support member connected with said board for supporting it, a pair of vertically spaced apart support arms each pivotally supported at one end on said frame and each pivotally connected at its other end to said rigid member, an arcuate brake rod supported on said frame with its arc substantially concentric with and substantially removed from the pivotal support at one of said support arms and extending in a vertical plane adjacent said one support arm, a friction grip locking member pivotally supported on said one arm at a point radially removed from the pivotal support of that support arm at a distance different than the radius of said arc, said member being rockable into and out of a rod gripping position and having means eccentric to its pivotal support for gripping said rod, the pivoted locking member being urged into a tighter rod gripping position when subjected to downward pressure by said rigid member, a foot operable pedal pivoted on said frame, and means operatively connecting said pedal to said locking member for rocking the locking member, said last mentioned means including a lever pivotally mounted on said frame and operatively connected to said pedal for movement thereby, and an operating link connected to said locking member and having a pivotal connection with said lever at a point located approximately in alignment with the pivotal support of said one support arm.

7. In combination with a table including a support frame and a top board, a vertically adjustable and lockable support for the board comprising, a vertically movable support member connected with said board for supporting it, a pair of vertically spaced apart support arms each pivotally supported at one end on said frame and each pivotally connected at its other end to said rigid member, an arcuate brake rod supported on said frame with its arc substantially concentric with and substantially removed from the pivotal support at one of said support arms and extending in a vertical plane adjacent said one support arm, a friction grip locking member pivotally supported on said one arm at a point radially removed from the pivotal support of that support arm at a distance different than the radius of said arc, said member being rockable into and out of a rod gripping position and having means eccentric to its pivotal support for gripping said rod, the pivoted locking member being urged into a tighter rod gripping position when subjected to downward pressure by said rigid member, a foot operable pedal pivoted on said frame, and means operatively connecting said pedal to said locking member for rocking the locking member, said last mentioned means including a lever pivotally mounted intermediate its ends on said frame; a first operating link operatively connecting one end of said lever to said pedal for movement thereby, a second operating link operatively connected to the other end of said lever and to said locking member for moving the latter in response to movement of the lever, said second operating link having a pivotal connection to said lever and said pivotal connection being located at a point approximately in alignment with the pivotal support of said one support arm.

8. In combination with a drafting table including a drawing board, a stationary support frame, a vertically movable board support means including an arm pivotally mounted on said frame for movement about a generally horizontal axis for adjustably supporting said board, means for locking said board in selected adjusted positions comprising a rod attached to said frame, an elongated locking bar having an opening loosely embracing said rod when the bar is disposed substantially perpendicular to the rod, said opening having a margin shaped to lockingly grip the rod when the bar is tilted from said substantially perpendicular position, means pivotally mounting said bar on said board support means for movement about a generally horizontal axis disposed transverse to said bar and laterally offset from said opening in said bar, a lever pivotally mounted on said frame, means including a link connected to said locking bar and pivotally connected to said lever at a point located approximately in alignment with the pivot axis of said arm for rocking said locking bar, means yieldably urging said bar in one direction relative to said board support means to normally tilt the bar relative to the rod to grip the latter, and manually controlled means operatively connected to said lever for rocking said bar out of locking position.

9. The combination of claim 8 wherein said last mentioned means includes a foot operated pedal pivotally mounted on said frame, and means including a second link connecting said pedal to said lever.

10. In combination with a table including spaced side frames and a tiltable top board, a vertically adjustable and lockable support for the board comprising, upper and lower arms pivotally mounted at one end on each side frame for movement about upper and lower axes vertically spaced apart a preselected distance, a post at each end of the table, means pivotally attaching the outer ends of the arms to a respective post at points spaced vertically apart a distance substantially equal to said preselected distance, a table top support bracket pivotally mounted on the upper end of each post for supporting the top board thereon, means for selectively locking said arms in a vertically adjusted position, said arms being movable in a plane disposed alongside a portion of a respective side frame, means on each side frame guidably engaging at least one of the arms at each end of the table at a point intermediate the ends of the arm to inhibit lateral movement of the arms in all operative positions thereof, one of the items comprising the arm and the side frame having a wear resistant plate attached thereto for guidably engaging the other items.

References Cited by the Examiner

UNITED STATES PATENTS

| | | | |
|---|---|---|---|
| 1,866,450 | 7/32 | Burnley | 108—9 |
| 1,948,991 | 2/34 | Molly | 248—295 X |
| 1,953,026 | 3/34 | Scheuer | 108—6 |
| 1,956,546 | 4/34 | Froelich | 108—2 |
| 2,312,636 | 3/43 | Froelich | 108—2 |
| 2,356,924 | 8/44 | Froelich | 108—6 |
| 2,924,299 | 2/60 | Kanzelberger et al. | 188—67 |
| 2,982,050 | 5/61 | May | 108—6 X |
| 3,079,726 | 3/63 | May | 108—10 X |
| 3,140,559 | 7/64 | Grow et al. | 108—6 |

FRANK B. SHERRY, *Primary Examiner.*